June 9, 1942.　　F. P. FORSS　　2,285,702
PORTABLE POWER HAMMER
Filed July 18, 1940　　2 Sheets-Sheet 2
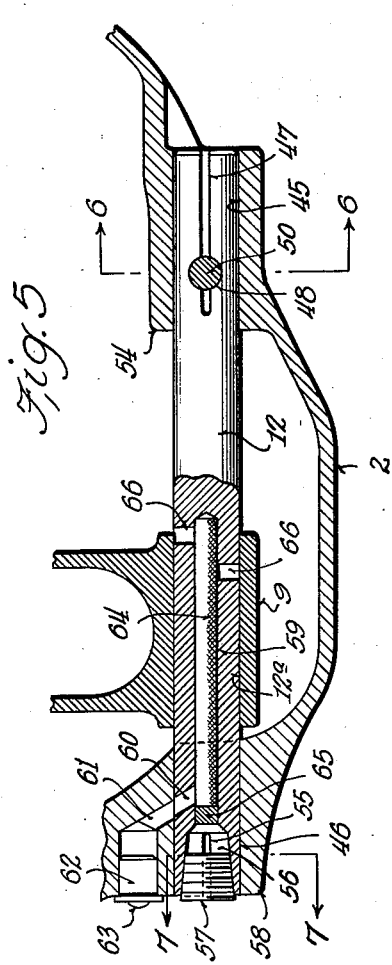
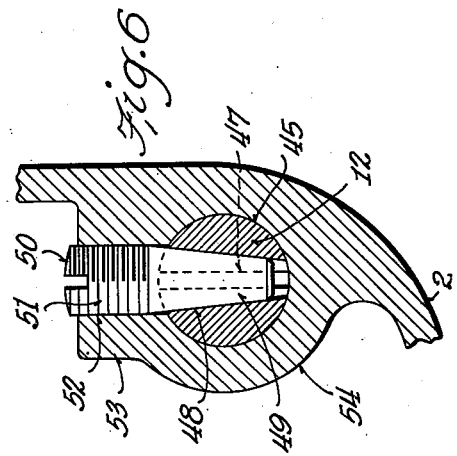
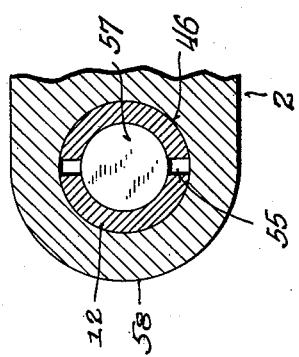
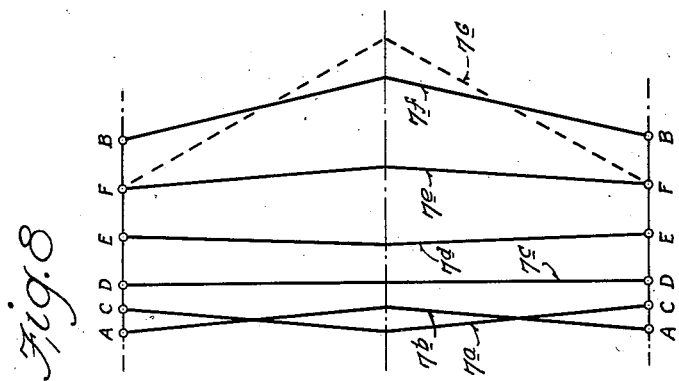
INVENTOR.
FRITHIOF P. FORSS
BY
ATTORNEY.

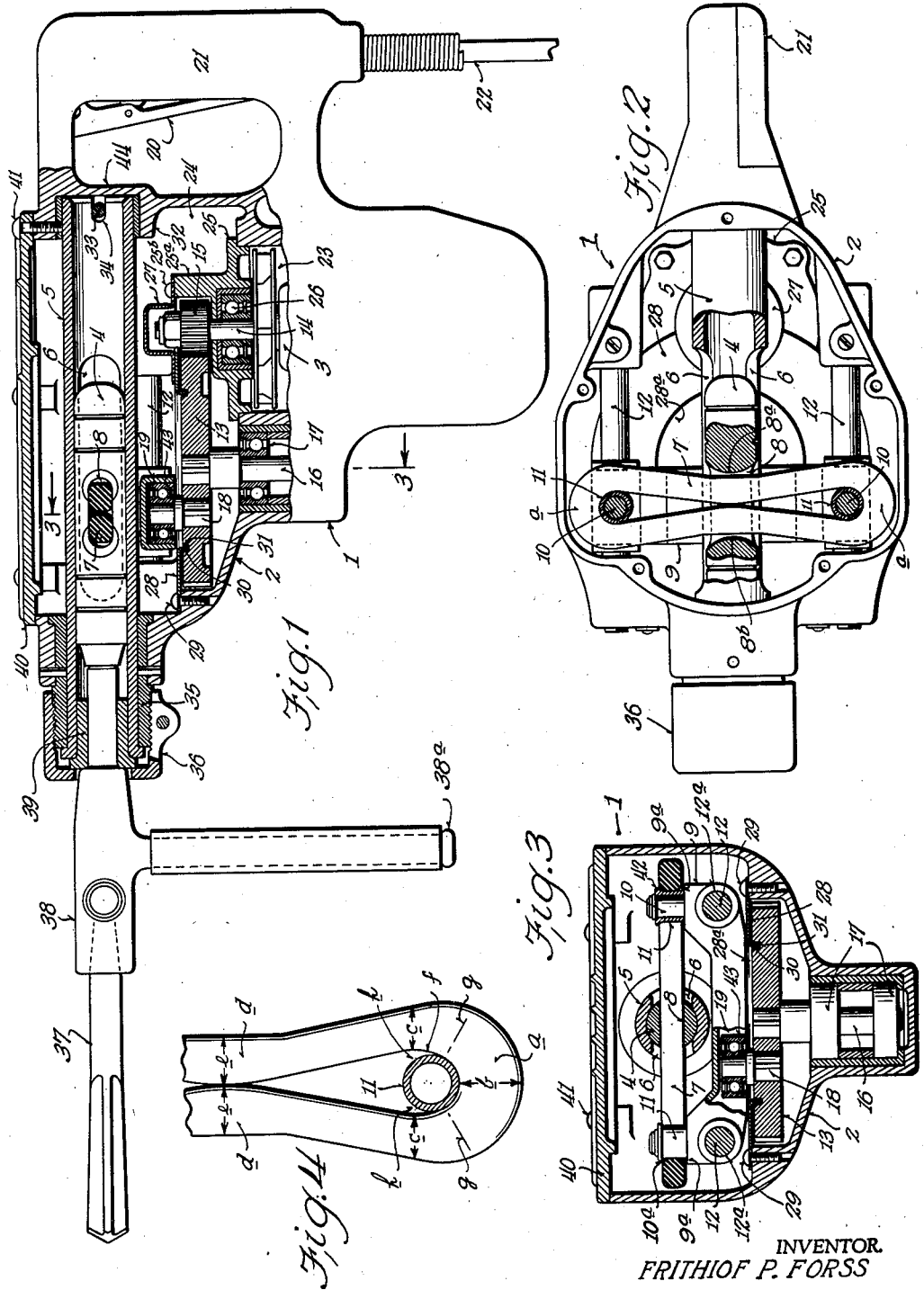

Patented June 9, 1942

2,285,702

UNITED STATES PATENT OFFICE 2,285,702

PORTABLE POWER HAMMER

Frithiof P. Forss, Aurora, Ill., assignor to Independent Pneumatic Tool Company, Chicago, Ill., a corporation of Delaware Application July 18, 1940, Serial No. 346,096

6 Claims. (Cl. 125—33)

This invention relates to improvements in portable electrically motor driven hammering tools of the type disclosed in the prior patents to Henry Schwob No. 1,951,169 and No. 1,951,170, both granted March 13, 1934 and No. 1,961,458 granted June 5, 1934.

The non-metallic elastic loop-like link or rubber yoke employed in these tools to impart the power strokes to the hammering piston from the motor driven reciprocable slide or cross-head element of the tool is subject to considerable flexing strains especially at the loop-shaped ends of the link in the operation of the tool. These strains are particularly severe at the ends of the piston strokes and more especially so at the end of the up-stroke of the piston at which time the piston is projected to the fullest extent of its upward movement ahead of the cross-head. The maximum stretching or distension of the link occurs at this time so that the link by reason of its flexibility may propel the piston on its hammering stroke with a whip action at an increased acceleration to develop the power required for the driving impacts on the chisel or drill steel inserted into the tool. The strains referred to occur at these moments of greatest distension on the link due to the tendency of the link to elongate or stretch beyond its normal length between the fixed anchoring studs on the slide or cross-head which mounts the loop-shaped ends of the link. Obviously, the maximum pull on the link material takes place at these fixed points and it is at these locations that the greatest internal wear or break down first occurs.

Also, the link in response to this stretching action tends to be tightened about the anchoring studs on the cross-head and a destructive abrasion is likely to occur as the link material moves on the studs.

The foregoing factors contribute to early link failure and frequent link replacements would be required in these tools as previously designed. It is to be understood that the cross-head and the link operate the piston with relatively short and very rapid piston strokes due to the power required for the driving impacts on the drill steel and the compactness and lightness in weight of the tool for portability and ease in handling and manipulation. These factors present a serious problem in link design and construction.

In keeping with the purpose to provide a more efficient and effective link, the principal object of my invention is to so reinforce the loop-shaped ends of the link that the strains on the link in the flexing and distension thereof will be so controlled and distributed that a more lasting and serviceable link construction may be produced.

In accordance with my invention, the link is molded or blanked from the desired flexible rubber material and the loop-shaped ends of the link are reinforced by increasing the mass of the link material at said ends so that the stretching strains on the link when flexed will be resisted and absorbed by the increased mass of the link to protect it from destructive internal strains.

A further object of my invention is to increase the mass of the link at the points of reinforcement in the general plane of the link so as to keep the link laterally narrow as required for a compact tool design.

A further object of my invention is to mount the loop-shaped ends of the link on freely turnable bushings on the anchoring studs on the cross-head to avoid undue destructive wear on the inner surface of the link at the studs.

A further object of my invention is to provide the openings at the loop-shaped ends of the link somewhat larger than the outside diameter of the supporting studs or bushings, as the case may be, to so lessen the peripheral contact between the parts in their normal positions that sharp angular bending of the link at the studs is prevented to further protect the link against destructive breaking.

A further object of my invention is to provide a tool design which is not only compact and relatively light in weight, but which houses and protects the link and the operative parts of the entire tool assembly within the outer casing of the tool.

Other and further objects of my invention will appear from the following specification taken in connection with the accompanying drawings, in which—

Fig. 1 is a side view of my improved hammering tool with parts broken away and in section and elevation, respectively, to show the link and the associated parts of the tool within the outer casing thereof;

Fig. 2 is a front view of the tool with the cover plate removed and with the link and the hammering piston and its guide tube shown in elevation and section, respectively;

Fig. 3 is a horizontal sectional view taken on the line 3—3 of Fig. 1;

Fig. 4 is a front view of one loop-end of the link to show its manner of reinforcement and the enlarged opening for the stud as heretofore recited;

Fig. 5 is a fragmentary sectional view with parts in elevation, showing the manner in which a guide rod to be later described is mounted in the tool casing;

Figs. 6 and 7 are sectional views taken on lines 6—6 and 7—7, respectively, of Fig. 5; and Fig. 8 is a diagram of the link and piston movement to be hereinafter described, In accordance with my invention, the tool has an outer casing 1 which houses and protects the operative parts of the tool. The casing 1 may be in the form of a casting comprising a body portion 2 fashioned to house and mount the electric driving motor 3 of the tool and the driving mechanism for reciprocating the impact piston 4 within its guide tube or cylinder 5.

The tube or cylinder 5 is suitably supported at its ends within the casing 2 and is provided along its opposite sides with substantially parallel slots 6, 6 whereby an elastic rubber yoke or loop-like link 7 may extend through the tube in crossing relation thereto to engage and actuate the hammering element 4. The link 7 extends through a passage 8 in the piston 4 and acts against the rounded surfaces of the piston at the upper and the lower ends 8a, 8b of the passage as shown in Fig. 2.

A cross-head or slide 9 is disposed in transverse relation to the tube 5 to the rear of the link 7 and is provided with rigid studs 10, 10 adjacent its opposite ends to receive and support the loop-shaped ends a, a of the link. These studs are at fixed distances on opposite sides of the tube 5, and carry freely revoluble bushings 11, 11 to mount the link on the studs as shown. The bushings are retained on the studs by enlargements 10a at the outer ends of the studs.

Parallel guide rods 12, 12 are fixed in the casing 2 for the cross-head 9. These rods extend through apertures 12a, 12a in the cross-head and constrain the cross-head to an up and down movement in the rotation of a gear wheel 13 by the armature shaft 14 of the driving motor 3. A pinion 15 is fixed to the outer end of the armature shaft and meshes with the gear wheel 13 to drive the same. The gear wheel 13 is keyed to and supported by a stub shaft 16 journaled in the casing 2 in one or more anti-friction bearings 17 as shown in Figs. 1 and 3. The shafts 14 and 16 are in parallel relation with the shaft 16 located below the shaft 14. A crank-pin 18 is carried by the gear wheel 13 on its outer side and engages the cross-head 9 in a longitudinal channel 19 therein to move the cross-head up and down on the guide rods 12 in the rotation of the gear wheel 13.

The switch 20 for the motor 3 is carried by the handle 21 of the tool. Said handle is located at the upper end of the tool casing 1 and is preferably cast integral therewith. The current supplying wires for the motor 3 are located in a cable 22 attached to the rear end of the handle as shown in Fig. 1.

The link or yoke 7 is molded or blanked in one-piece from the desired flexible or resilient rubber-like composition material and has its loop-shaped ends a, a increased in mass to reinforce the link in accordance with my invention. The increased mass is in the general plane of the link to keep the link to a substantially uniform thickness throughout as shown in the drawings. This enables the link to be made laterally narrow to adapt it to a compact tool design. Also, a narrow link is better adapted to the slot 8 in the piston 4 and may be readily and easily inserted into and removed from the slot in assembling and disassembling the tool.

The increased mass at the ends of the link has its greatest dimension along the longitudinal center line of the link as indicated at b in Fig. 4. From this section the mass diminishes gradually and preferably uniformly on opposite sides to the normal dimension of the link at the ends of its loops as indicated at c, c in Fig. 4. Here the loop-shaped ends of the link join with its arm portions d, d which extend through the slot in the piston 4 to drivingly connect the link to the piston. With the loop ends so reinforced, the strains on the link even at the greatest point of flexure will be resisted and absorbed before internal destructive stresses can occur. The section b of maximum area will adequately resist the pull on the link and cause the strains to be distributed throughout the joining sections of gradually lessening extent. In flexing counter-forces are set-up in the link on opposite sides of the larger section b. On an up-stroke of the piston, both arms d, d of the link flex upwardly. On a down stroke both arms flex downwardly. This creates pulls in opposite directions from opposite sides of the section b and as this section is increased in mass it is conditioned to well withstand and distribute these strains throughout the lesser sections. Hence, the life of the link is prolonged and a more efficient and serviceable link design results.

The mass of the link may be increased, if needed at the center of the link where it passes through the piston 4 as shown at e, e in Fig. 2. This will strengthen the link against strain and wear at the piston, but the greater strains will occur at the ends of the link because it is at these points that the link is fixed against free bodily movement.

It will be observed from Fig. 4 that the opening f at the loop-shaped end of the link is somewhat larger than the outside diameter of the supporting stud, that is, the outside diameter of the bushing 11. This reduces the peripheral contact between the link and the bushing in the normal position of the link, that is, when the link spans the space between the two studs when not stretched or flexed to a greater extent than necessary for the link to engage the studs as indicated in Figs. 2 and 4. This is the normal position of the parts when the link is applied to the tool. With this arrangement, the contact between the link and the stud or the bushing is about one-third or 120 degrees of the circumference of the bushing as indicated by the dotted lines g, g in Fig. 4. From this area of contact the link leaves the bushing as indicated at h, h, which spaces increase radially until the distance is reached where the loop-shaped ends a join the side arms d. Hence, when the link is flexed, either upwardly or downwardly with respect to the studs 10, the spaces h allow the inner edges of the link at its openings f to follow about the cylindrical contour of the studs to prevent breakage of the link at the studs as heretofore. This is another factor of my invention for the link protection.

The link 7 is preformed to the size and shape desired. This gives the link an inside dimension to fit the distance between the studs 10. The link is made to fit easily about the bushings 11 to facilitate the application of the link to the studs. With the enlarged openings f, f at the ends of the link, excessive wear on the link at the studs is prevented. This is also augmented by the rotatable bushings 11 which are free to turn in response to the pull of the link in its flexing action.

It will be noted that the casing 1 completely houses and protects the operative parts of the tool. In accomplishing this result, the chamber 23 in the casing 1 which houses and mounts the electric motor 3 connects with the chamber 24 which houses the tube 5 and the associated parts of the driving mechanism for the piston 4. The front end of the chamber 23 is closed by a wall section 25 which not only provides a support for the anti-friction bearing 26 for the front end of the armature shaft 14, but provides an extension 25a over the upper end of the pinion 15 as shown. This extension 25a provides a support for a sheet-metal cover 27 over the pinion 15 and the end of the armature shaft 14. The cover 27 is secured to the extension 25a by a fastening screw 25b and overlaps an annular shield plate 28, which may be of sheet-metal, and which plate overlies the outer surface of the driving gear 13. The crank-pin 18 extends through the center opening 28a in the plate 28. The latter is secured to the casing by one or more screws 29 and has an inturned flange 30 about its inner edge extending into an annular groove 31 in the adjacent face of the gear wheel 13. The covers 25, 27 and 28 provide a grease enclosure for the driving gears 13, 15. The flange 30 keeps the grease from getting out of the enclosure and onto the rubber link 7.

The upper end of the tube 5 fits in a boss 32 within the casing 2 and said tube is held against turning by a cross-pin 33 as shown. This pin engages a slot 34 which opens through the upper end of the tube to allow for its withdrawal from the casing when disassembling the tool. The tube 5 is insertable into the tool casing at its lower end through a sleeve 35 onto which screws a clamp 36 for holding the tube in place. The drill steel 37 for the tool is used with a turnable holder 38 which is insertable at its upper end into the tube 5 through the clamp 36 to receive the impacts of the piston 4. A bushing 39 is clamped in the lower end of the tube 5 by the clamp 36 to accommodate the upper end of the holder 38 as shown. The holder 38 has a side handle 38a for turning it.

A cover plate 40 closes the chamber 24 on the front side of the tool casing and is secured in place by one or more screws 41. The guide rods 12 are inserted into the tool case at the chamber 24 through alined openings in the casing body 2 above and below said chamber. This enables alined borings to be made for the rods, the upper and lower ends of the latter being supported and fixed in these borings in the manner detailed in Figs. 5, 6, and 7. The rods are preferably circular to reduce the manufacturing costs of the tool and to also simplify its construction. With the rods supported at their ends in the tool case, the intermediate portions of the rods are available to mount the slide or cross-head 9 and thus the slide and the rods may be located within and housed by the tool case.

With the reinforcements for the flexible link or yoke 7 in the general plane thereof, the link may be made relatively narrow as before stated and moreover, have relatively flat front and rear faces to engage flatwise against the flat sides of the passage 8 and against the flat shoulders 9a, 9a on the slide 9 about the studs 10 as shown in Fig. 3. The outer ends of the bushings 11 are preferably flanged or enlarged as at 42 to retain the yoke thereon as shown in Fig. 3.

The tool structure shown and described is compact and simple in construction and operation. The tool may be used in confined quarters and with its parts housed within an outer casing, said parts are amply protected from dust and dirt as well as from contact with exterior objects. An anti-friction roller 43 is mounted on the crank-pin 18 to promote ease of operation at the cross-head 9.

The flexing to which the rubber link 7 is subjected is indicated in the diagram in Fig. 8. In this diagram, A and B indicate, respectively, the limits to which the slide or cross-head 9 is moved by the crank-pin on the driving gear 13. The position A indicates the lower extent of the movement and the position B indicates the upper extent of the movement. Due to the flexibility of the link 7, the piston or hammering element 4 may have a longer travel than the cross-head 9 and, hence, considerable power may be stored up in the piston to deliver the blows on the drill steel.

When the slide or cross-head reaches the position C on the downward stroke, the link 7 has been stretched downwardly as shown at 7a and the hammer or piston 4 has delivered its blow against the drill steel. The hammer starts to recoil and continues to do so during the period of time that the cross-head moves from the point C to the terminal point A at the bottom of the stroke. At this point the cross-head reverses and the link 7 having been flexed or stretched in the upward direction by the recoil as indicated at 7b the piston 4 is slightly ahead or in advance of the cross-head on its return stroke. When the cross-head reaches the point D which is about one quarter of the stroke of the cross-head, the cross-head and the piston are about even and the link 7 is in its normal position extending between the studs on the cross-head as indicated at 7c. When the link 7 reaches the half way point E, the cross-head is at its greatest acceleration and the link is flexed somewhat downwardly (see 7d) due to the upward pull of the cross-head on the piston. This continues up to the point F which is about three-quarters of the stroke from the lower position A and the piston due to its inertia or momentum by the upward pull of the cross-head on the link causes the piston to move ahead of the cross-head in the direction of its rearward movement. This is shown at 7e. When the cross-head reaches the point B the cross-head slows down relatively as the crank-pin passes over the center and the piston under the effect of the upward pull of the cross-head in passing point F continues on its rearward stroke beyond the terminal point B as shown at 7f. Now the cross-head reverses and when it reaches the point F, the link under the continuing rearward movement of the piston is stretched or distended to its fullest extent as indicated at 7g. The cross-head now accelerates on its downward stroke causing the piston to reverse. This exerts a downward pull on the piston, which pull plus the acceleration imparted to the piston by the fully distended flexed link increases the velocity of the piston until the cross-head reaches the mid-point E. At this point, the greatest pull is exerted on the piston and the stretched rubber link is now on its own, so to speak, with the result that the link whips the piston downwardly with a rapid power stroke causing the piston to strike the drill steel with considerable power and force. This action enables the tool, although portable for hand manipulation, to develop ample striking power.

It will be noted in Fig. 1 that the upper end of the tube or cylinder 5 at the boss 32 is closed by the end wall 44 of the outer case 2 of the drill. The upward travel of the piston is above the upper ends of the side openings 6 in the tube 5. The result of this is that when the piston moves above these openings the air entrapped in the tube between the upwardly moving piston 4 and the end wall 44 is compressed. The action of this compressed air is to slow down the piston slightly in its upward movement and thus condition the parts for the reverse action as described in connection with Fig. 8.

Hammering tools by reason of the nature of the work which they perform are, naturally, subjected to considerable vibration and jar. It is essential, therefore, that the guides for the moving parts be held in position with sufficient rigidity to prevent their misalinement and this is especially necessary in a tool of the character described wherein the slide or cross-head 9 is mounted on guide rods 12. The manner of mounting and securing these rods in the tool case 2 is detailed in Figs. 5, 6, and 7.

As previously stated the rods 12 are fixed in borings made in the case 2. In Fig. 5, these borings are marked 45, 46 for the opposite ends of the rod 12 shown in this figure. The other rod 12 is similarly mounted and secured in place, Fig. 5 only detailing the arrangement at one rod.

The upper end of the rod 12 is slotted longitudinally as at 47 and this slot extends along that portion of the rod which fits within the upper bore 45. The rod is preferably made solid and the slot 47 extends clear through the rod opening through its upper end as shown in Fig. 5. The lower end of the slot 47 is closed as shown. The rod is bored transversely at a point midway the ends of the slot to provide a tapered bore 48 as detailed in Fig. 7. The bore 48 receives the tapered inner end portion 49 of a fastening screw 50. This screw has its threaded section 51 between the head of the screw and the taper 49. These threads engage threads in a tapped opening 52 in the inside wall 53 of the boss 54 which accommodates the boring 45. When the screw is screwed into the opening 52 the tapered inner end 49 extends into the bore 48 in the rod and by reason of the cooperating tapers the split portion of the rod is pressed transversely into tight circumferential contact with the wall of the bore 45.

The lower end of the rod is also slotted longitudinally as at 55. Also the lower end of the rod at the slotted portion is provided with a tapered socket 56 having internal screw threads to receive threads on a tapered screw or plug 57. Hence, when the plug 57 is screwed into the socket 56 the split lower end of the rod is spread outwardly into tight contact with the surrounding wall of the bore 46. This bore is provided in the lower bossed portion 58 on the tool case 2 as shown in Fig. 5.

To lubricate the bores 12a in the cross-head 9 at the rods 12, each rod is provided with a bore 59. This bore is made through the lower end of the rod at the recess 56. The rod just inward from this recess is provided with a cross-port 60 which connects with the bore 59 as shown in Fig. 5. This port connects at its outer end with an oiling passage 61 in the tool casing to one side of the boss 58 and the outer end of this passage is closed by a plug 62 equipped with a spring biased ball check 63 as in lubricating systems. Located in the bore 59 is a wick section 64. The lower end of the bore 59 is closed by a brass plug 65 to prevent the lubricant carried by the wick escaping from the bore at the slots 55. The rod is provided with outlet ports 66, 66 for the lubricant within the bore 12a in the cross-head. In this way the cross-head bore is adequately supplied with lubricant, yet the amount of lubricant supplied is controlled by the wick and hence, no opportunity is afforded for the lubricant getting on the rubber link or yoke 7.

The details of construction and arrangement of parts shown and described may be variously changed and modified without departing from the spirit and scope of my invention, except as pointed out in the annexed claims.

I claim as my invention:

1. A portable motor driven power hammer of the character described comprising in combination, an outer casing having interconnected first and second chambers, an impact element and means for reciprocating the same both located within the first chamber, said means comprising a reciprocable driving element and an elastic loop-like link connected at its mid-portion with the impact element and at its loop-shaped ends with the driving element about studs thereon on opposite sides of the impact element, a power motor located within the second chamber and having a gear and crank-pin connection with the driving element in the first chamber, and means including a shield plate engaged over the outer surface of the gear and having an inturned flange thereon extending into an annular groove in the gear to provide a lubricant enclosure therefor.

2. A portable motor driven power hammer of the character described comprising in combination, an outer casing, piston and reciprocable driving elements both located within said outer casing, guides for the respective elements, the guides for the driving element being in the form of rods on opposite sides of the piston, a flexible rubber loop-like link extending through the piston and having its loop-shaped ends engaged about studs on the driving element for reciprocating the piston, said rods having their opposite ends split longitudinally and located in bores in the outer casing, fastener elements for spreading the split ends of the rods into tight contact with the bores for clamping the rods in the casing, and power means for reciprocating the driving element.

3. A portable motor driven power hammer of the character described comprising in combination, an outer casing, piston and reciprocable driving elements, both located within said outer casing, guides for the respective elements, the guides for the driving element being in the form of rods on opposite sides of the piston, a flexible rubber loop-like link extending through the piston and having its loop-shaped ends engaged about studs on the driving element for reciprocating the piston, said rods having their opposite ends split longitudinally and located in bores in the outer casing, fastener elements for clamping the split ends of the rods in said bores, each of the fastener elements having a tapered section extendible into a tapered recess in the rod to spread the split ends of the rod into tight engagement with said bores, and power means for reciprocating the driving element.

4. A portable motor driven power hammer of the character described comprising in combination, piston and reciprocable cross-head elements, guides for the respective elements, a support for said guides, a flexible rubber loop-like link connected with the piston and having its loop-shaped ends engaged about studs on the cross-head on opposite sides of the piston for reciprocating the same, means for slowing down the motion of the piston on its return stroke for reversal by the cross-head, and power means for reciprocating the cross-head.

5. A portable motor driven power hammer of the character described comprising in combination, piston and reciprocable cross-head elements, guides for the respective elements, a support for said guides, the guide for the piston being in the form of a tube containing the piston, a flexible rubber loop-like link extending through the piston and the tube and having its loop-shaped ends engaged about studs on the cross-head on opposite sides of the tube for reciprocating the piston, said tube having slots for the passage of the link and being closed at its end above the slots whereby the piston on its return stroke may entrap and compress air within the tube above the slots to slow down the piston for reversal by the cross-head, and power means for reciprocating the cross-head.

6. In a portable power driven hammering tool of the character described having a tool motor, an impact element, a reciprocable driving element driven by the tool motor and having studs on opposite sides of the impact element, guides for the respective elements, and a solid, one-piece resilient rubber yoke in link-like form having arm portions having driving connection with the impact element and loop-shaped end portions engagable about the studs, said loop-shaped end portions gradually increasing in cross-sectional size radially about the studs from the arm portions with the maximum cross-sectional dimension intermediate the ends of the loop-shaped portions, said loop-shaped end portions having the openings therein for the studs larger in diameter than the studs to contact the studs for less than half their circumference in the normal position of the yoke between the studs, whereby clearance spaces are provided for the inner edges of said loop-shaped end portions at the studs to follow about the studs in the flexing of the yoke in the operation of the hammer and the heavier cross-section at the ends of the yoke will tend to resist abnormal stretching of the yoke at its loop-shaped end portions to prevent breakage of the yoke at the studs.

FRITHIOF P. FORSS.